(12) United States Patent
Ni et al.

(10) Patent No.: US 11,119,786 B2
(45) Date of Patent: Sep. 14, 2021

(54) AUTOMATED MULTIDIMENSIONAL ELASTICITY FOR STREAMING APPLICATION RUNTIMES

(71) Applicant: INTERNATIONAL BUSINESS MACHINES CORPORATION, Armonk, NY (US)

(72) Inventors: Xiang Ni, Yorktown Heights, NY (US); Scott Schneider, White Plains, NY (US); Kun-Lung Wu, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 16/426,644

(22) Filed: May 30, 2019

(65) Prior Publication Data

US 2020/0379773 A1 Dec. 3, 2020

(51) Int. Cl.
| | |
|---|---|
| *G06F 9/46* | (2006.01) |
| *G06F 8/77* | (2018.01) |
| *G06F 11/34* | (2006.01) |
| *G06F 9/38* | (2018.01) |
| *G06F 9/30* | (2018.01) |

(Continued)

(52) U.S. Cl.
CPC .......... *G06F 9/3851* (2013.01); *G06F 9/3009* (2013.01); *G06F 9/5083* (2013.01); *G06F 8/77* (2013.01); *G06F 9/455* (2013.01); *G06F 9/5055* (2013.01); *G06F 11/3447* (2013.01)

(58) Field of Classification Search
CPC .... G06F 9/3851; G06F 9/3009; G06F 9/5083; G06F 9/455; G06F 9/4843; G06F 9/4881; G06F 9/5038; G06F 9/50; G06F 9/5055; G06F 9/45533; G06F 9/45558; G06F 11/3612; G06F 11/3466; G06F 11/34; G06F 11/3409; G06F 11/3447; G06F 11/3452; G06F 9/3457; G06F 8/77
USPC .................... 714/38.1, 47.1; 712/227; 718/1, 718/100–108
See application file for complete search history.

(56) References Cited

U.S. PATENT DOCUMENTS

| | | | |
|---|---|---|---|
| 8,656,396 B2 | 2/2014 | Andrade et al. | |
| 9,652,362 B2 * | 5/2017 | Gupta | ................... G06F 21/552 |

(Continued)

FOREIGN PATENT DOCUMENTS

CN 104794015 A 7/2015

OTHER PUBLICATIONS

T. De Matteis and G. Mencagli, "Keep calm and react with foresight: Strategies for low-latency and energy-efficient elastic data stream processing," Proceedings of the 21st ACM SIGPLAN Symposium on Principles and Practice of Parallel Programming, PPoPP 16, 2016.

(Continued)

*Primary Examiner* — Daniel H Pan
(74) *Attorney, Agent, or Firm* — Griffiths & Seaton PLLC

(57) ABSTRACT

Embodiments for automating multidimensional elasticity for streaming applications in a computing environment. Each operator in a streaming application may be identified and assigned into one of a variety of groups according to similar performance metrics. One or more threading models may be adjusted for one or more of the groups to one or more different regions of the streaming application.

20 Claims, 10 Drawing Sheets

(51) Int. Cl.
*G06F 9/50* (2006.01)
*G06F 9/455* (2018.01)

(56) References Cited

U.S. PATENT DOCUMENTS

| | | | |
|---|---|---|---|
| 2014/0282525 A1* | 9/2014 | Sapuram | G06Q 40/00 718/1 |
| 2016/0062880 A1* | 3/2016 | Moretto | G06F 11/3414 714/38.1 |
| 2018/0067778 A1* | 3/2018 | Hawilo | G06F 9/5066 |
| 2019/0129747 A1* | 5/2019 | Kim | G06F 9/5011 |
| 2019/0327271 A1* | 10/2019 | Saxena | G06N 3/0454 |

OTHER PUBLICATIONS

H. Miao, and others, "StreamBox: Modern stream processing on a multi-core machine," in Proceedings of 2017 USENIX Annual Technical Conference (USENIX ATC 17), pp. 617-629, 2017.

T. Akidau and others, "The dataflow model: A practical approach to balancing correctness, latency, and cost in massive-scale, unbounded, out-of-order data processing," Proc. of VLDB Endow, 8(12), Aug. 2015.

S. Schneider and K.-L. Wu, "Low-synchronization, mostly lock-free, elastic scheduling for streaming runtimes," in Proceedings of th e38th ACM SIGPLAN Conference on Programming Language Design and Implementation, PLDI 2017, pp. 648-661.

Thread and Process Scheduling for Minimal Processing/Communication Latency Anonymously; Sep. 14, 2016.

Mechanism for Operational Risk Monitoring, System Testing Optimization and Root Cause Analysis for Complex Applications Anonymously; Jul. 9, 2014.

Method and System for Reusing Stream Processing Modules Across Different Platforms Morales, GDF. et al.; Oct. 8, 2013.

Distributed Data Stream Processing and Edge Computing: A Survey on Resource Elasticity and Future Directions De Assuncao, MD. et al.; Jul. 2017.

The Go Programming Language Alan A. A. Donovan • Brian W. Kernighan Published Oct. 26, 2015 in paperback and Nov. 20 in e-book Addison-Wesley; 380pp; ISBN: 978-0134190440.

* cited by examiner

AUTOMATED MULTIDIMENSIONAL ELASTICITY FOR STREAMING APPLICATION RUNTIMES

BACKGROUND OF THE INVENTION

Field of the Invention

The present invention relates in general to computing systems, and more particularly, to various embodiments for automating multidimensional elasticity operations for streaming applications in a computing environment using a computing processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing, storing, and/or retrieving various amounts of information is a key problem to solve.

SUMMARY OF THE INVENTION

Various embodiments for automating multidimensional elasticity for streaming applications in a computing environment by a processor, are provided. In one embodiment, by way of example only, a method for automating multidimensional elasticity for streaming applications in a computing environment, again by a processor, is provided. Each operator in a streaming application may be identified and assigned into one of a variety of groups according to similar performance metrics. One or more threading models may be adjusted for one or more of the groups to one or more different regions of the streaming application.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
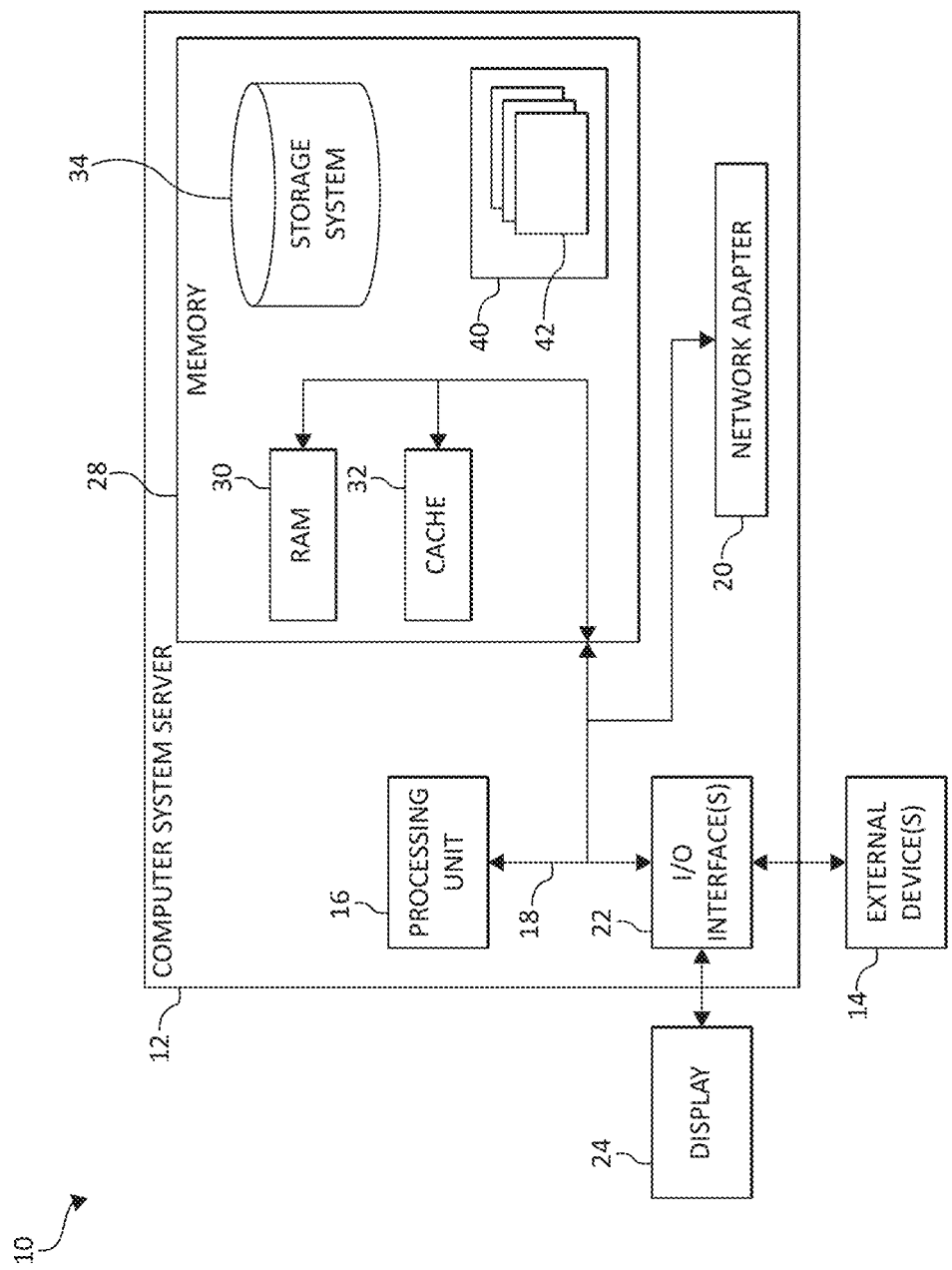
FIG. 1 is a block diagram depicting an exemplary cloud computing node according to an embodiment of the present invention.

Online stream processing has emerged to meet the demands of processing large amounts of data with low latency and high throughput. Streaming applications exhibit abundant opportunities for pipeline parallelism, data parallelism and task parallelism. The languages and frameworks for stream processing are parallel and distributed and use a dataflow programming model to abstract the development for parallel and distributed systems. However, despite these abstractions, tuning the performance of application deployments is still an intensive task for developers and administrators. Further, streaming application deployments are increasingly moving to cloud computing. In an environment where the physical hardware that the streaming application runs on is unknown or can potentially change across deployments, intensive performance tuning becomes increasingly difficult.

To exploit the right configuration of parallelism, automated performance elastic mechanisms are introduced into online stream processing such as, for example, IBM® Streams (which is an advanced computing platform that allows user-developed applications to quickly ingest, analyze, and correlate information as it arrives from thousands of real-time sources and can handle very high data throughput rates, up to millions of events or messages per second) to ease the effort of manual tuning. (IBM® is a trademark of International Business Machines Corporation). However, individual performance elastic mechanisms are designed with different objectives leading to potential negative interactions and unintended performance degradation.

However, in the context of performance optimization, stream processing applications are typically long-running, which is a property that can be exploited. Because of the nature of the problems they solve—processing large amounts of continually arriving data—a typical application deployment may be "live" for weeks or months. Thus, long-running applications are amenable to online, automatic performance-based adaptation because adaptation phases are easily amortized. Such application adaptations can help solve the difficulties of optimizing the performance of complicated parallel and distributed applications deployed to unknown hardware.

Accordingly, the present invention provides for different interfering performance elastic mechanisms/operations that are coordinated to maximize performance gains with stable and fast parallelism exploitation to solve the difficulties of optimizing the performance of complicated parallel and distributed applications deployed to unknown hardware while also addressing various performance elastic mechanisms designed with different objectives.

In one aspect, the present invention provides for an elastic performance operation that automatically adapts different threading models to different regions of an application. The present invention provides for a coherent ecosystem for coordinating the threading model elastic operations with a thread count elastic component. An online, stable multilevel elastic coordination scheme may be used that adapts different regions of a streaming application to different threading models and number of threads. The present invention may be implemented in a multi-level coordination scheme that (a) scales to over a selected number of threads (e.g., over hundreds of threads); (b) can improve performance by an order of magnitude on two different processor architectures when an application can benefit from multiple threading models; and (c) achieves performance comparable to hand-optimized applications but with much fewer threads.

In an additional aspect, the present invention provides an automating multidimensional elasticity for streaming applications in a computing environment. Each operator in a streaming application may be identified and assigned into one of a variety of groups according to similar performance metrics. One or more threading models may be adjusted for one or more of the groups to one or more different regions of the streaming application.

Thus, the present invention provides an automatic solution that coordinates the adjustment of the threading model of individual operators with an existing thread count performance adaptation operation. In one aspect, a coordination operation identifies/finds a scheduling solution for multiple performance elastic components that improves performance with stability, accuracy, settling time, and overshoot ("SASO") guarantees, which means the coordination operation provides stability (no oscillation between adjustments of the thread model or thread count), achieves increased computing accuracy (e.g., finding the threading model and thread count that maximizes throughput), provides shorter settling time (e.g., reaches a stable configuration quickly), and avoids overshoot (e.g., does not use more threads than necessary).

In one aspect, the present invention provides a multi-level performance elastic system to coordinate the threading model selection/choice at the operator level in tandem with the adjustment of thread count. The multi-level performance elastic system may perform a control operation that uses runtime metrics and local control to achieve SASO properties in order to quickly adapt to varying workload with performance guarantee. The multi-level performance elastic system provides an empirical evaluation on two processor architectures using benchmarks and applications that demonstrates scalability to over a hundred threads, better resource utilization, and more than at least 10 times ("10×") throughput gains.

In an additional aspect, the present invention provides for an online elastic operation to adjust the threading model choice of operators in streaming applications. An efficient multidimensional elastic framework may be used when multiple interfering elastic components coexist.

A primary adjustment may be performed where the primary adjustment is only a change in thread count. A thread count change triggers the search to find the locally optimal threading model configuration for that number of threads and avoids exhausting the system resource. The primary adjustment in thread count may cause higher variation in performance than changes in threading models. Hence, if thread count adjustment is in an inner loop as a secondary adjustment, the performance impact of the outer loop threading model adjustment becomes less tractable, which in turn makes it harder to apply consistent corrective adjustments to the threading model choices.

In one aspect, the adjustment to the thread count and/or thread model may be a multidimensional elasticity adjustment with an initial adjustment operation being performed. In one aspect, the initial adjustment operation starts with a selected number of threads (e.g., a minimum number of threads) and no operator selecting a dynamic threading model. In this way, the multidimensional elasticity adjustment operation may avoid exhausting the system resources and/or avoid early termination.

An optimization operation may be performed to maintain/keep track of the thread range (e.g., range "N, M") that is optimized with a recent threading model adjustment, meaning from thread count "N" to thread count "M," the optimal threading model configuration remains unchanged. The optimization operation may monitory and/or track the performance improvement by the primary adjustment. If the primary adjustment (e.g., only a thread count adjustment) improves the performance by a significant amount, the secondary adjustment (e.g., a threading model) may be skipped unless the thread count alters again.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16 (which may be referred to herein individually and/or collectively as "processor"), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
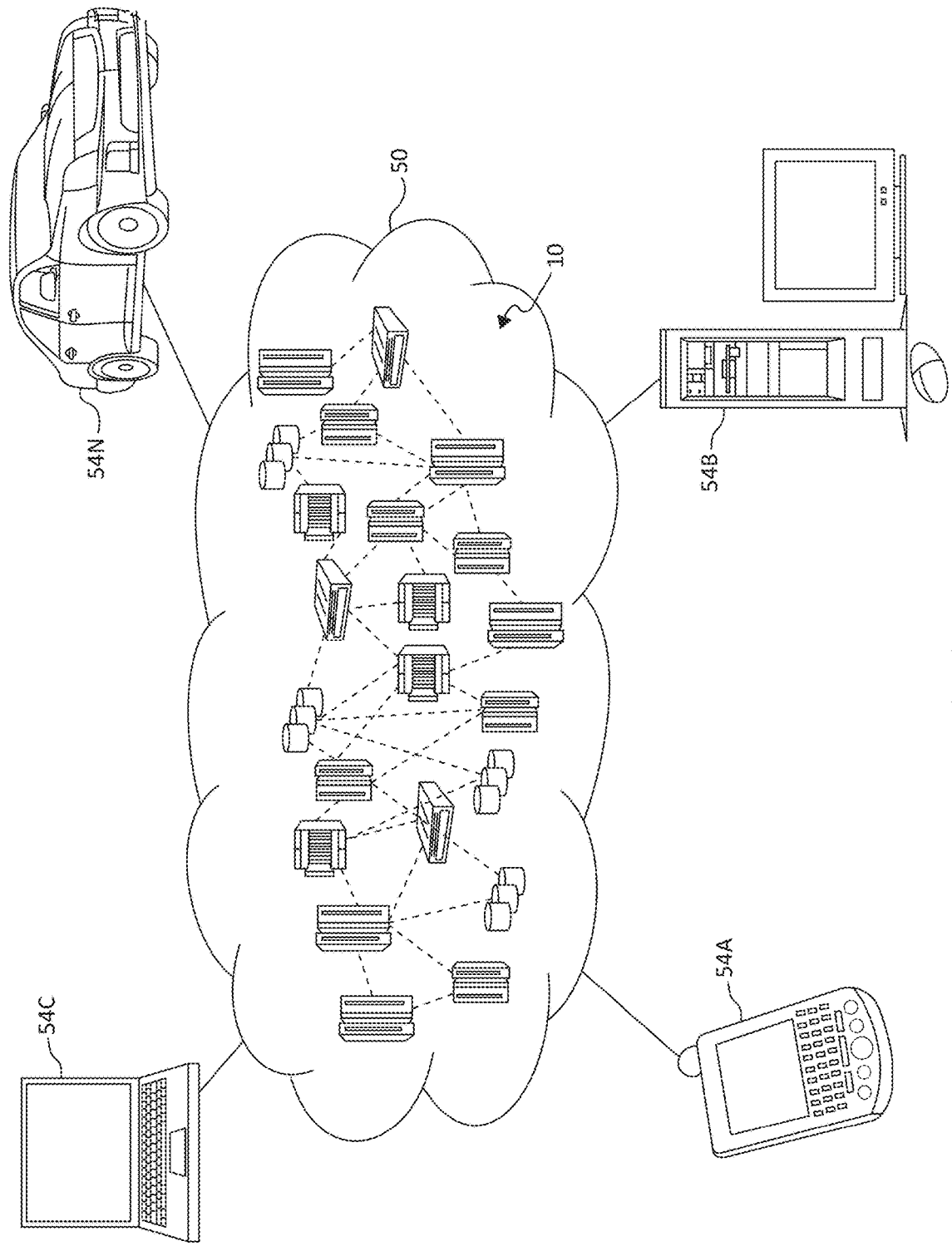
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
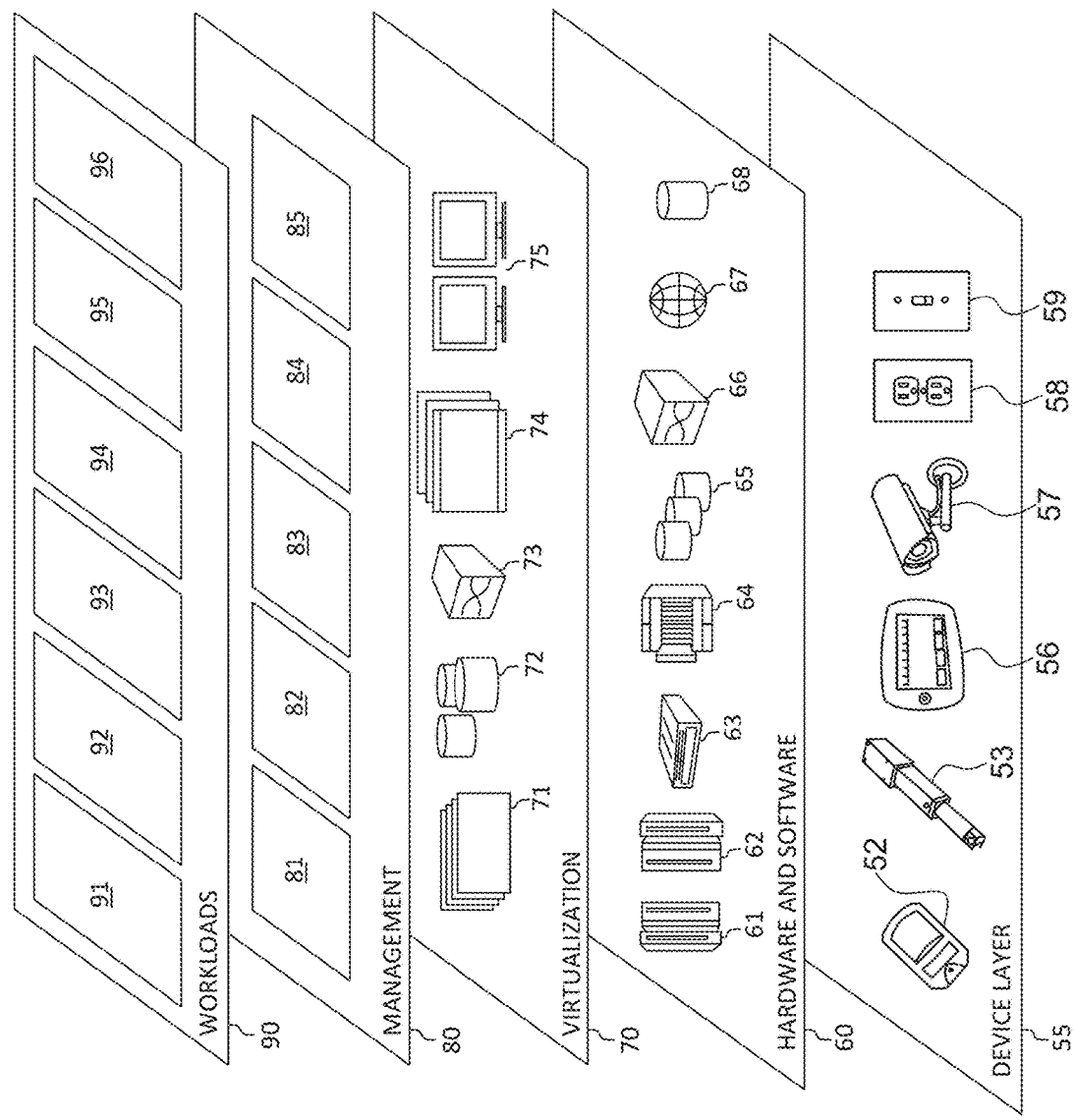
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for identifying non-deterministic models. In addition, workloads and functions 96 for identifying non-deterministic models may include such operations as data analysis, machine learning (e.g., artificial intelligence, natural language processing, etc.), user analysis, IoT sensor device detections, operation and/or analysis, as will be further described. One of ordinary skill in the art will appreciate that the workloads and functions 96 for identifying non-deterministic models may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for automating multidimensional elasticity for streaming applications in a computing environment, again by a processor. Each operator in a streaming application may be identified and assigned into one of a variety of groups according to similar performance metrics. One or more threading models may be adjusted for one or more of the groups to one or more different regions of the streaming application.

Also, streaming applications exhibit abundant opportunities for pipeline parallelism, data parallelism and task parallelism. To exploit the right configuration of parallelism, automated performance elastic mechanisms may be, for example, introduced in IBM® Streams, to ease the effort of manual tuning. The programming language for some application streams may be streams processing language ("SPL"), which is a dataflow language with primary abstractions for streams, operators and tuples: operators receive and emit tuples on streams of data. For example, one or more streams may provide a dynamic threading model with thread count elasticity to the SPL runtime. By dynamically adjusting the number of threads at runtime, thread count elasticity allows the SPL runtime to automatically scale and take advantage of multicore systems. However, this scalability is achieved through a heavy-handed mechanism: it introduces scheduler queues in front of every operator. As a result, threads can freely execute any operator by pulling tuples from the corresponding queue. The use of schedulers queues incurs two major overheads: 1) copy overhead due to the fact that tuples in SPL are statically allocated and 2) synchronization overhead when tuples are passed to downstream operators. As the operator count scales, an increasing list of scheduler queues means that each thread has to spend longer time in finding work. Programmers can manually annotate regions that should be executed by a single thread to avoid such overheads, but that manual annotation process removes the benefit of automation.

Said differently, three primary abstractions in an SPL are operators, tuples and streams. Operators are the primary actors: they are event based and execute when they receive tuples on their input ports. Tuples are structured data items with strongly-typed attributes. There are no restrictions on the kind of logic that executes inside an operator, except that it can only natively access state local to the operator. Operators can produce tuples, which are submitted to their output ports. The input and output ports of operators are connected by streams. At job submission, operators are divided among PEs (processing elements). PEs with connected operators communicate over the network. Inside of a PE, connected operators communicate either through function calls or queues. PEs are how streams takes advantage of multiple hosts, and threads inside of a PE are how streams takes advantage of multicore hosts.

Figure 4:
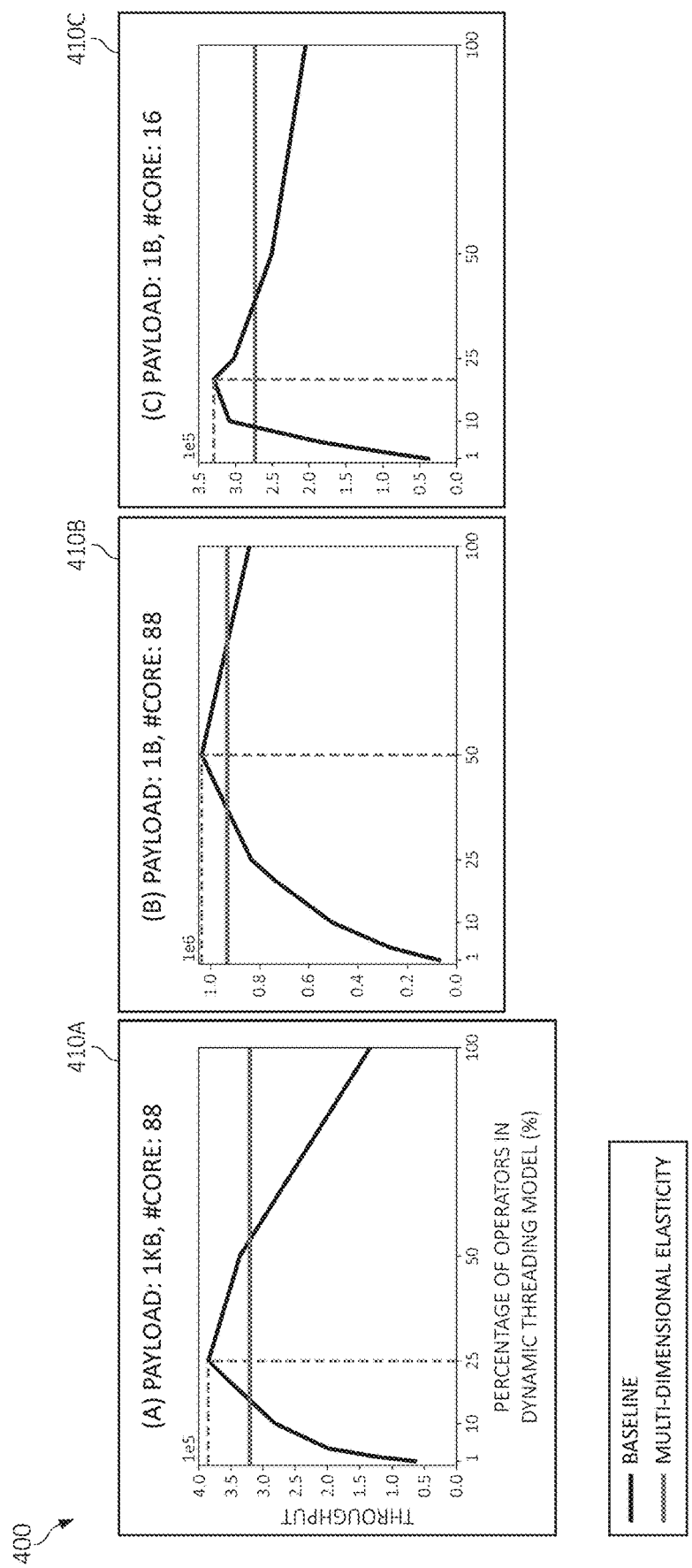
FIG. 4 are graph diagrams depicting percentages of operators in a dynamic threading model.

To further illustrated FIG. 4 depicts graph diagram 400 showing percentages of operators in a dynamic threading model. In one aspect, FIG. 4 depicts graphs 410A-C depicting the throughput of a 100 operator pipeline while varying the percentage of operators executed under the dynamic threading model, i.e., operators with a scheduler queue in front of them. Operators not under the dynamic threading model are executed by the threads from upstream operators. The workload of each operator is 100 floating-point operations per second ("FLOPs") per tuple. The tuple payload may vary from 1 B (byte) to 1 KB (kilobyte) and the available resource from 16 cores to 88 cores.

All throughputs are measured after thread elasticity has settled on the best number of threads for that configuration. The takeaway from the graphs 410A-C of FIG. 4 is that the optimal/best throughput is not achieved when all operators are executed under the dynamic threading model, and that the optimal configuration varies. Tuple copying and thread synchronization costs dictate that some sections of the application should be single-threaded.

The existing thread count elasticity solves a single dimensional problem, but these experiments graphs 410A-C of FIG. 4 illustrate that there is an additional dimension—threading model elasticity. In one aspect, "threading model elasticity" means that the streaming runtime has two separate but interfering performance elastic components making online adjustments. These performance control operations run at separate intervals, modify different components of the runtime, and do not explicitly refer to each other, but they are interfering because the modifications made by one component affects the decisions made by the other.

It should be noted at this point, in one aspect, threading models and thread count elasticity may be used in the SPL runtime, which enables one or more PEs to launch multiple threads to execute operators. However, a manual threading model uses the threads already introduced by the programmers or operators because programmers must manually introduce threads between operators at compile-time to add more parallelism. However, a dynamic threading model may inject scheduler queues between each operator, and the SPL runtime maintains a set of scheduler threads that can execute any operator.

A thread count elasticity operation may monitor the total throughput across all operators and dynamically change the number of threads to maximize that throughput and the present invention is concerned with two types of threads in the streams—operator threads and scheduler threads. For example, operator threads drive the execution of source operators. When a source operator, where all work begins, submits tuples through its output ports, the associated operator thread executes the downstream operators in an application data flow graph, where operators are nodes of the graph and tuples flow through the links of the graph, until it encounters a queue or an operator sink. The operator thread then resumes execution of the source operator logic. Scheduler threads are used by the dynamic threading model. Scheduler threads obtain tuples from scheduler queues associated with the input ports of an operator and execute the operator. When any thread encounters a scheduler queue, it pushes its current tuple into that queue and continues executing from its source operator. Scheduler threads are not bound to a specific input port or operator. They incur synchronization overhead—as any scheduler thread can execute any operator using the dynamic threading model—but they are adaptable and enable more parallelism.

Figure 5:
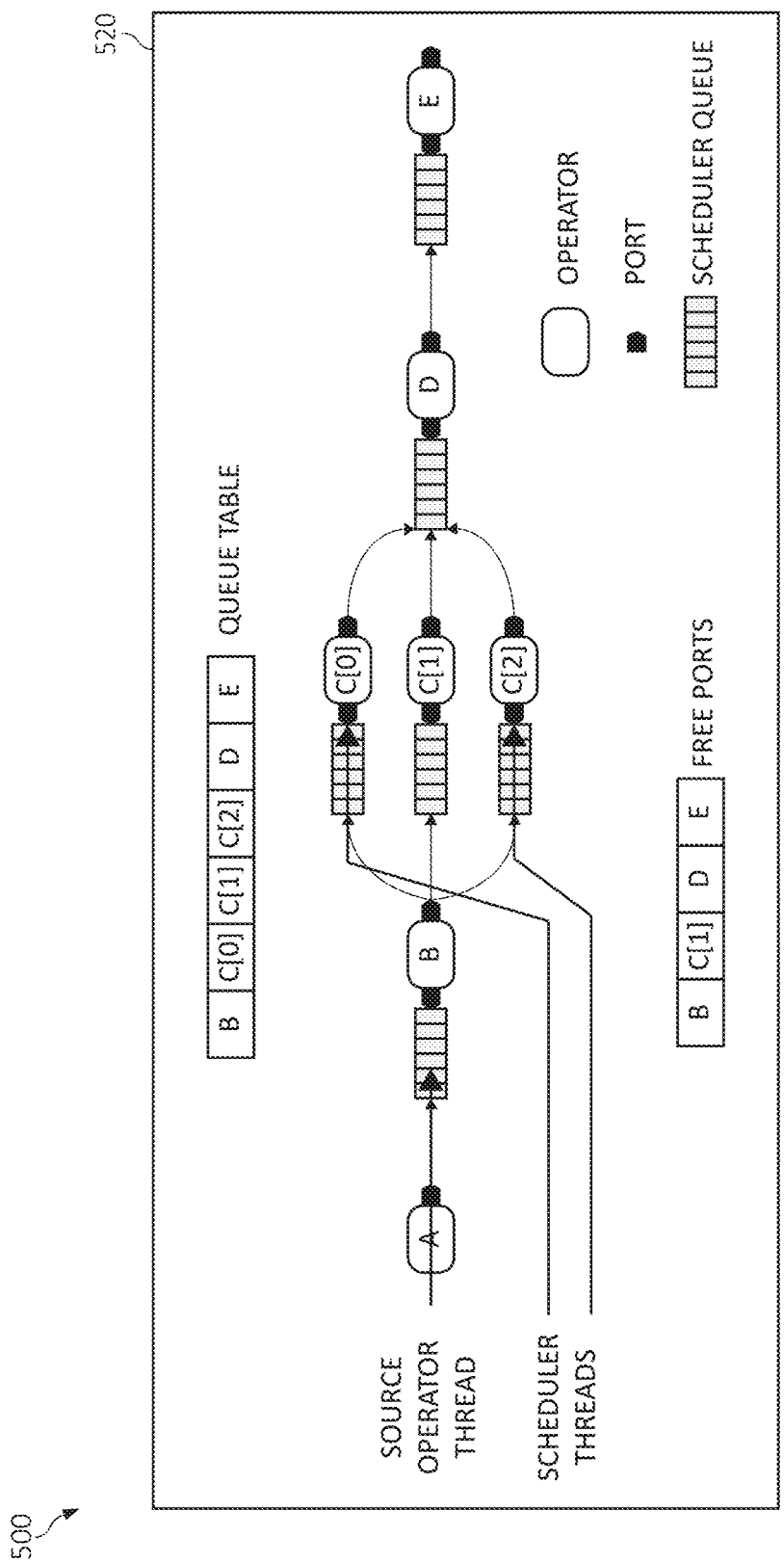
FIG. 5 is an additional block diagram depicting operations for dynamic modeling for streaming applications in which aspects of the present invention may be realized.

Turning now to FIG. 5 is a block diagram depicting operations for dynamic modeling for streaming applications. That is, FIG. 5 depicts an exemplary dynamic threading model 500. In one aspect, one or more of the components, modules, services, applications, and/or functions described in FIGS. 1-4 may be used in FIG. 5.

In one aspect, the dynamic threading model 500 may include a source operator (e.g., operator A), one sink (e.g., operator E), and 5 regular operators (e.g., operators B, C[0], C[1], C[2], and/or D) That is, the dynamic threading model 500 may include one operator thread and two scheduler threads. The queues table 520 maps operator input ports to scheduler queues and remains unchanged. The free ports 510 lists the operators that are currently not executed by any scheduler thread. Scheduler threads actively search/look for tuples from the scheduler queues associated with the operators in free ports 510 and then remove those operators from the free ports 510 when they find work when there are tuples in the schedule queues. The number of scheduler threads is elastically adjusted by the SPL runtime to maximize throughput. The dynamic threading model 500 provides a solution that, in threading model terms, automatically partitions an application into dynamic and manual threading model regions. That is, when there are queues in front of an operator, the operator is in dynamic threading model, otherwise the operator is in manual threading model. In threading model terms, the present invention automatically adjusts the threading model for each operator.

In one aspect, the present invention (e.g., via the dynamic threading model 500) provides for a new elastic operation that adjusts the threading model when the thread count is fixed, and then extend the elastic operation to coherently adjust both the threading model and thread count. That is, the elastic threading model and thread count adjustments for need to be ordered to avoid interfering so as to identify 1) the correct adjustment direction and/or 2) the correct primary adjustment. The new elastic operation uses an operator performance (e.g., cost) metric, which is computed during runtime with low overhead. In one aspect, the operator metric measures the percentage of CPU time spent on this operator in comparison to all other operators on the same procession element. In one aspect, the cost metric may be a performance metric which may be a value, a threshold, a percentage, and/or a value within a defined range such as, for example, a range of 0 to 1.

The operator performance (e.g., cost) metric is an indicator of the relative computation workload of operators. To compute the performance (e.g., cost) metric, a runtime level per-thread state variable may be registered for each thread in the system, which is set to the corresponding operator index when threads enter the processing logic of that operator. A profiler thread wakes up every profiling period to take a snapshot of the state of all the actively running threads. The profiler thread maintains counters for each operator and increments the counter by the number of times that operator appears in the snapshot. This counter directly correlates with the relative operator cost and is reported as the operator cost metric.

It should be noted that the threading model elasticity provides for automatically selecting the threading model for each operator in order to improve performance. Given an "N" number of operators, the exploration space may contain $2^N$ configurations, and thus an exhaustive search is not a scalable solution. The following two observations allow to reduce the search space to a linear search: 1) (e.g., observation 1 or "O1") if the performance/cost metric of an operator is relatively high (e.g., greater than 0.5), there are higher chances (e.g., greater than a defined threshold or percentage) for it to benefit from the use of the dynamic threading model, i.e., it is more likely that additional parallelism amortizes scheduling and queuing overheads, and 2) (e.g., observation 2 or "O2") there is performance improvement when an operator uses the dynamic threading model, similar performance gains may be expected if other operators that have similar cost metrics are executed with the dynamic threading model.

In one aspect, the present invention may begin with all operators (e.g., those operators under a manual threading model, i.e., there are no scheduler queues. Per the first observation ("O1"), the control operation may prioritize selecting a dynamic threading model for computationally heavy operators and may terminate the exploration when turning more operators to use the dynamic threading model no longer improves performance. Per the second observation ("O2"), a logarithmic binning may be performed by dividing operators into profiling groups (e.g., groups having the same performance/cost metrics). That is, given that the operator performance/cost metric is within 0 to 1, the present invention using the logarithmic binning may divide operators to different bins based on cost metric such as, for example: [0, ½], [½, ¾], [¾, ⅞], [⅞, 1]. Rather than testing the dynamic threading model selection/choice with each individual operator, the granularity of adjustment may be set at the level of the group of operators. The present invention may start from the group with a highest, relative similar performance metrics such as, for example in a selected group (e.g., group "$G_h$"). If there is performance improvement with the use of the dynamic threading model for every operator in the selected group (e.g., group $G_h$), the present invention may move on to group $G_{h-1}$ to examine the group with the next-highest relative performance/cost among the remaining groups.

If there is performance degradation due to the change in threading model choice for the selected group (e.g., group $G_h$), the present invention may analyze the selected group (e.g., group $G_h$) and determine if performance improvement can be achieved with part of the group choosing the dynamic threading model (described next). Both (O1) and (O2) help to satisfy the settling time property of SASO.

Within each group, an elastic control operation may perform a binary search to select the right set of operators that should use the dynamic threading model, guided by the performance trend learnt through exploration. Broadly speaking, the threading model elasticity operation may test new configurations in the direction that has the possibility of providing higher performance based on the currently collected data. For example, if there is data from fewer operators selecting the dynamic threading model there has been a failure of not exploring using more operators, and the data suggest that throughput increases with the operator count, the logical thing to do is to select the dynamic threading model for more operators. The search space pruning does potentially reduce accuracy. For example, assume that group $G_h$ was the last group to show performance improvement, and a binary search was performed within the group $G_h$ to identify/find a set of operators to use the dynamic threading model. In one aspect, it may be possible that a partial set of group $G_{h+1}$, and none of group $G_h$, may yield increased/better performance.

Figure 6:
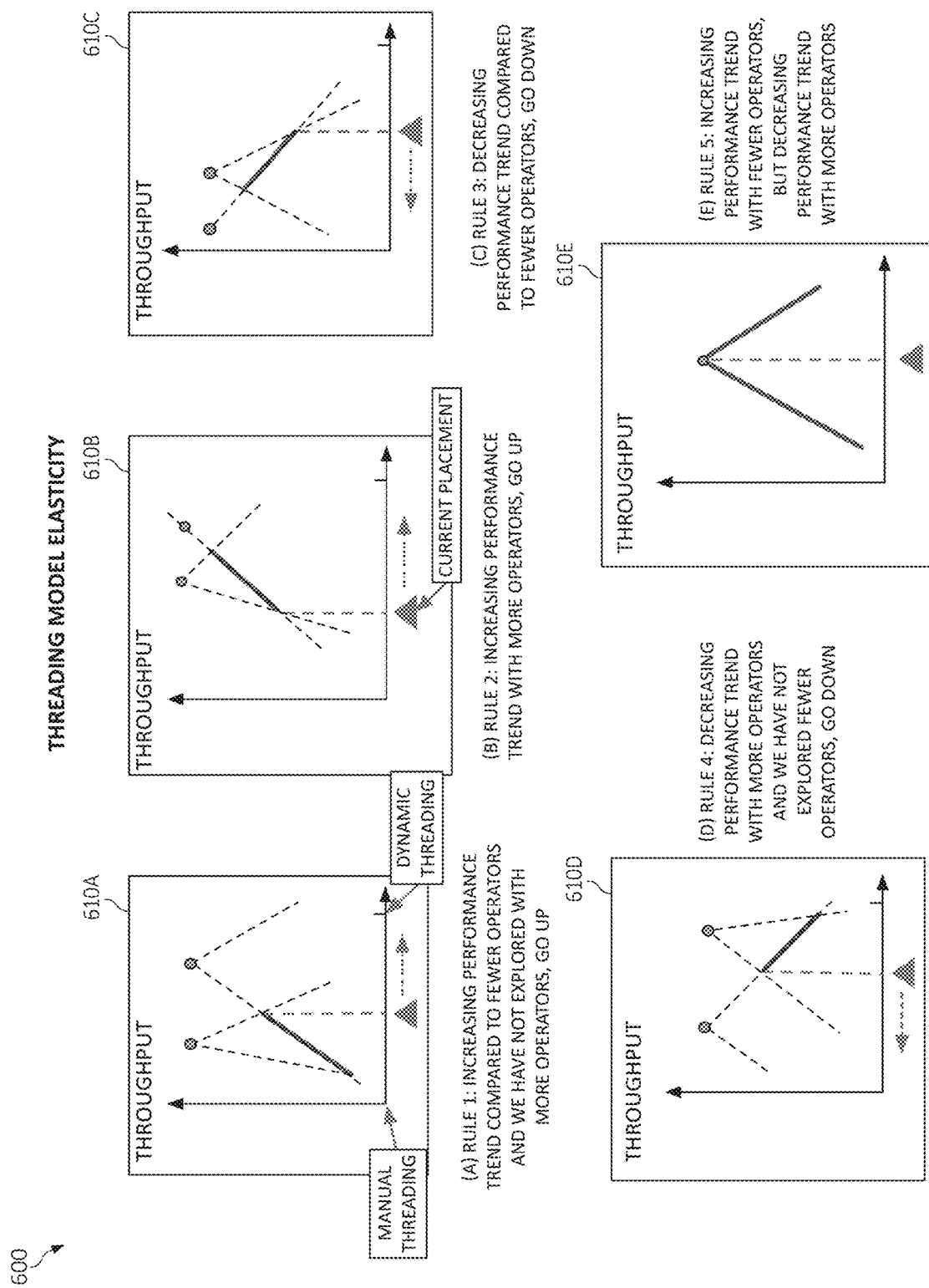
FIG. 6 is a graph depicting operations for selecting and adjusting threading model for streaming applications in which aspects of the present invention may be realized.

Turning now to FIG. 6, block flow diagram 600 depicts various graphs 610A-E illustrating operations for selecting and adjusting threading model for streaming applications. As shown, the various steps of functionality of graphs 610A-E are depicted with arrows designating the steps of graphs 610A-E relationships with each other and to show process flow. Additionally, descriptive information is also seen relating each of the functional steps of the graphs 610A-E of FIG. 6 such as, for example, the dynamic threading model 500 of FIG. 5. With the foregoing in mind, the module steps of graphs 610A-E may also be incorporated into various hardware and software components of a system for image enhancement in accordance with the present invention. Many of the functional steps of graphs 610A-E may be executed as background processes on various components, either in distributed computing components, or on the user device, or elsewhere.

In one aspect, the steps of graphs 610A-E provide a step-by-step view and operation of the threading model elastic component and explore threading model selection with selected lines (e.g., solid lines) indicating the measured performance trends and the triangle indicating a current number of operators that uses dynamic threading. A dotted arrow may be used to indicate the action for next step such as, for example, whether to increase or decrease the number of operators for dynamic threading. The following pseudocode illustrates, for example, the operations for elasticity operations for threading model selection:

```
enum AdjustDecision{CONTINUE, STAY, CHANGE}
AdjustDecision threadingModelAdjustement( ) {
    if (currCount == binSize - 1 && perfIncWithMore( )) {
        //continue the threading model adjustment with the next group
        currGroup = nextGroup; threadingModelAdjustement( );
    } else if ((perfIncWithMore( )){
        increaseCount( ); return CONTINUE;
    } else if (perfDecWithMore( )){
        decreaseCount( ); return CONTINUE;
    } else {
        if (currCount == 0) return STAY;
        else return CHANGE;
    }
}
``` where, "currCount" refers to the number of operators choosing dynamic threading in the latest adjustment and "binSize" refers to the number of operators in the current group. In one aspect, one or more rules may be used to elastically partition operators into different threading model regions. As illustrated in graph 610A, rule 1 ("R1") indicates that when there is an increasing performance trend compared to fewer operators using the dynamic threading model and more operators have not explored, one or more operators may be added in the dynamic threading model region. As illustrated in graph 610B, rule 2 (R2), if there is an increasing performance trend when operator count increases, the operator count may be increased. As illustrated in graph 610C, rule 3 ("R3"), when there is a decreasing performance trend compared to fewer operators using the dynamic threading model, the operator count may be decreased.

As illustrated in graph 610D, rule 4 ("R4"), when there is a decreasing performance trend with more operators and we have not explored with fewer operators, the operator count may be decreased. As illustrated in graph 610E, rule 5 ("R5"), when there is an increasing performance trend compared to both fewer operators and/or compared to more operators using the dynamic threading model, the search may be stopped when performance improvement of dynamic threading model applies to every operator in the current group and the adjustment operation may be moved to/applied on a subsequent/next group. The current performance trend may be composed by only two performance data points: the last adjustment and the current adjustment. Hence it may be difficult to determine where the optimal configuration may lie just through the performance trend.

Accordingly, the optimal configuration of threading model through adaptive adjustment may be analyzed and/or determined.

For example, in graph 610A of FIG. 6 an the optimal configuration may either lie on the left side of the current adjustment (e.g., left or right in relation to the point the triangle points to in FIG. 6)—indicating a performance increasing performance trend followed by decreasing performance trend and the current adjustment actually falls on the downward trend, or it may lie on the right side of the current adjustment—indicating the current adjustment falls on the upward trend. However, as the illustrated embodiments proceed for the scenario in graph 610A, the present invention may either end up with the case in graph 610A again (e.g., observing an increasing trend as in 610A), which confirms that the optimal configuration lies on the right side of the current placement, or end up with graph 610C, which indicates that the optimal configuration lies on left side in graph 610A. Similar observations can be made about the scenario of graph 610D. As progress in made during a search for the optimal configuration of threading model, the scope of one or more possible optimal configuration may be limited/stopped. Eventually, when the difference in operator count between two consecutive adjustments is short enough to establish the relationship in (R5), the exploration to identify the optimal configuration of threading model may terminate.

A return value of the elastic queue placement operation, "AdjustDecision," may have three possible states: 1) continue state ("CONTINUE"), 2) stay (e.g. "STAY"), and 3) a change state ("CHANGE"), as illustrated in the above pseudocode. The return value "CONTINUE" may suggest that one or more adjustments may be required to be made with continuous performance monitoring. The "STAY" state means that adjusting the threading model selections/choices may not improve performance and thus the present invention may should stay with the current placement. The "CHANGE" state means that the search may have found a better/improved threading model adjustment. It should be noted that the rules (R1) and (R2) may satisfy the accuracy property of SASO by adding operators to the dynamic threading model region for potential performance gains if an upward performance trend is observed.

Rules (R3) and (R4) may also provide the accuracy property in SASO by exploring in the reverse direction if a downward trend exists. All the rules from (R1) to (R5) satisfy the stability property in SASO: the present invention does not oscillate between adjustments since observations from the past are remembered and represented as performance trends.

In one aspect, a dedicated adaptation thread may be used to periodically monitor the throughput changes. The period between observation and adjustment should be long enough to have the change reflected in throughput and short enough to detect workload change. A selected time period (e.g., 5, 10, 20 seconds, etc.) may be defined/used for one or more streams applications. The observed performance change should enable differentiation from system noise. Hence, the present invention provides for a sensitivity threshold ("SENS"). A smaller SENS value favors detecting changes while a larger SENS value favors stability. The SENS value may be defined and/or selected such as, for example a SENS value 0.05 percentage which means that there must be an observation of at least a 5% performance difference before establishing a performance trend. In one aspect, search for various threading model changes within a profiling group may provide multiple alternative selection option. For example, a first selection option may be that for a given that "N" number of operators, an arbitrary set of the N number of operators may be selected from within the group for using the dynamic threading model. In one aspect, the present invention provides for limiting the scope of threading model adjustment within a group of operator may eliminate variance, since operators within a group have a similar performance metric.

In one aspect, the present invention may also provide for ensuring tuple order. When the elasticity operation makes the decision to switch the threading model from dynamic to manual model for an operator, the present invention may maintain the correct tuple order and unprocessed tuples may still exist in one or more scheduler queues (see FIG. 5) that have been disabled. To maintain the correct tuple order, subsequent tuples received at an input port of an operator (see FIG. 5) are not processed until the queue associated with that port is cleared. In one aspect, an adaptation thread may drain/empty the queue immediately after making the queue adjustment decision and drains the remaining tuples. However, a single adaptation thread cannot scale to a large number of queues. This is not a scalable approach as the number of queues removed increases. The temporary load imbalance and delay may also interfere with the performance monitoring. In order to discern the throughput change caused by the changes in the queue placement correctly, the present invention may wait until all the disabled queues are empty to resume the throughput monitoring. Having just one thread responsible for that task essentially may slow down the whole process.

Thus, in an alternate aspect, the present invention enables scheduler threads (e.g., see FIG. 5) to prioritize to find work from the disabled queues first. However, this complication in the scheduling logic unnecessarily incurs overhead in the common case when there is no queue to be removed. Accordingly, the present invention may provide a "passive" approach by leaving the responsibility to drain queues to an upstream operator when trying to submit the next tuple as illustrated in the following pseudocode:

scheduler queue is made by the adaptation thread while tuples are produced and consumed by scheduler threads.

In order to avoid memory inconsistency, a flag may be used to indicate that a queue is enable (e.g., "queueEnabled") that needs to be protected. Multiple upstream operators may send tuples to the same operator at the same time. Thus an atomic state variable may be used to ensure that only one upstream operator actively processes tuples from the inactive queue while others wait for the drain to complete before submitting following tuples. In this way, the present invention may adaptively parallelize processing of pending tuples from inactive queues and thus is least intrusive.

It should be noted that the threading model performance elastic component may be used and integrating to one or more entities and coordinate the threading model elastic component with the existing thread count elastic component. Because incompatibilities between the adaptive components can lead to unstable poorly-tuned performance feedback loop, the present invention may effectively and quickly explore the configuration space through an iterative refinement process by fixing one elastic thread model component at a time while making adjustment for the other until no performance improvement can be gained.

In one aspect, the present invention provides for a primary adjustment (e.g., primary elastic adjustment). The primary elastic adjustment may include one or more options, which are as follows.

Option 1) is a change in thread count. A change in thread count triggers a search to find the locally optimal threading model configuration for that number of threads. Option 2) is a change in threading model. Threading model changes trigger finding a locally optimal number of threads for the current threading model configuration.

In aspect, although either option is available, Option 1 may be selected over option 2 so as to avoid exhausting

```
void disableSchedulerQueue( ) {
    queueEnabled = false; //mutex protected
}
void submit(Tuple & tuple) {
    if (queueEnabled) {// mutex protected
        submitToQueue(tuple); // submit tuple to the queue
    } else {
        if (tryDrain( )) {
            drainQueue( ); // processing all the remaining tuples in the queue
            process(tuple) // invoking the function associated with the tuple
            drainCompleted( );
        } else {
            waitUntilDrained( );
            process(tuple) // invoking the function associated with the tuple
        }
    }
}
bool tryDrain( ) {
    expected = UNDRAINED;
    return state.compare_exchange_strong(expected, DRAINING, memory_order_acquire);
}
void drainCompleted( ) {
    state.store(DRAINED, memory_order_release);
}
void waitUntilDrained( ) {
    while (state.load(memory_order_acquire) != DRAINED);
}
```

This means that after a queue is removed from an operator, when new tuples are produced for it by upstream operators, the thread executing the upstream operator processes the pending tuples before processing the newly created tuples. The decision to disable the use of a certain system resources. First, for example, if the thread count adjustment was secondary, the present invention may repeatedly increase the number of threads up to the point of performance degradation. Doing so may be required in finding the optimal number of threads. Hence, the system may be oversubscribed much more frequently during the adaptation period. Second, changes in thread count may cause higher variation in performance than changes in threading models. Hence, if thread count adjustment was the secondary adjustment, the performance impact of the outer loop threading model adjustment became less tractable, which in turn made it harder to apply consistent corrective adjustments to the threading model choices.

In one aspect, in relation to adjustment direction and starting conditions, the present provide for using either 1) a maximum number of available threads where every operator would choose to use dynamic threading, or 2) a minimum number of threads where no operator would select/choose dynamic threading. In this way, the starting conditions determine the adjustment direction. Starting with full parallelism means the operation will reduce the number of available threads, and starting with no parallelism means the operation will introduce the number of threads. Said differently, when the maximum number of threads and queues were used (since every operator is under dynamic threading), the operation would reduce the number of threads and take away queues from the least expensive operators. In selecting the second adjustment direction by starting with the minimum number of threads may achieve increased accuracy because it starts by enabling parallelism with the most expensive operators, which provided a more reliable signal and provides the benefit of being more likely to avoid system over-subscription.

Figure 7:
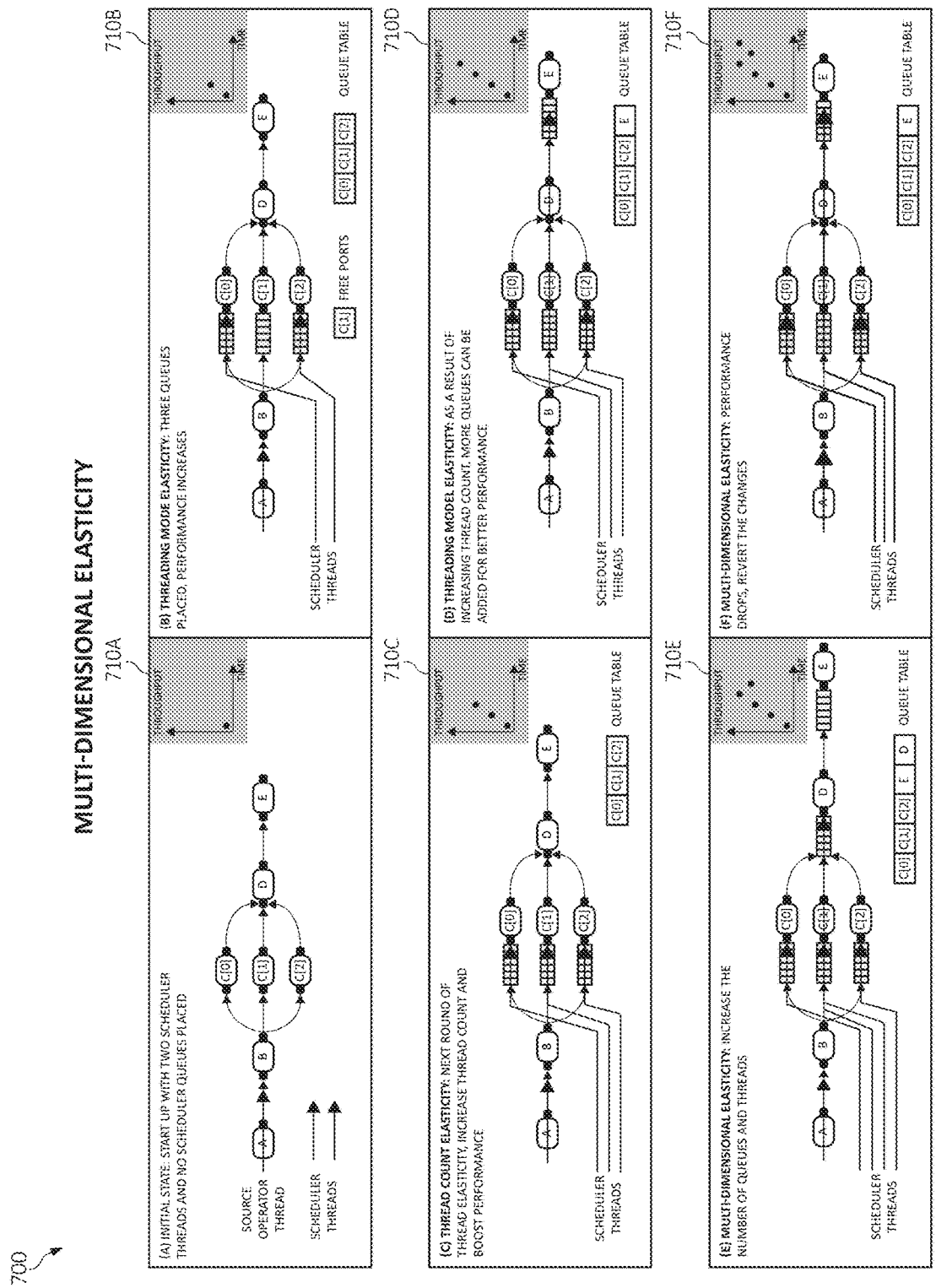
FIG. 7 is an additional block diagram depicting operations for multilevel elasticity in which aspects of the present invention may be realized.

Turning now to FIG. 7, block diagram depicting operations for multilevel elasticity 700 (e.g., multidimensional elasticity). That is, FIG. 7 depicts the multilevel elasticity in operation by the interaction between threading model and thread count elasticity.

As shown, the various steps of functionality of multilevel elasticity operations 710A-F are depicted. Additionally, descriptive information is also seen relating each of the functional operations of the multilevel elasticity operations 710A-F of FIG. 7. With the foregoing in mind, the multilevel elasticity operations 710A-F may also be incorporated into various hardware and software components of a system for image enhancement in accordance with the present invention. Many of the functional multilevel elasticity operations 710A-F may be executed as background processes on various components, either in distributed computing components, or on the user device, or elsewhere. In one aspect, one or more of the components, modules, services, applications, and/or functions described in FIGS. 1-6 may be used in FIG. 7 such as, for example, the dynamic threading model 500 of FIG. 5.

Starting in multilevel elasticity operations 710A, in an initial state, no operator uses the dynamic threading model, hence the only source operator thread will execute all downstream operators. Two scheduler threads exist but remain idle since there are no scheduler queues for them to find work from.

Next, in a threading mode elasticity, the PE explores the threading model choices, which adds scheduler queues for operators C[0], C[1] and C[2] as depicted in the multilevel elasticity operation 710B. As a result, the two scheduler threads are no longer idle and throughput improves.

Next, if the maximum number of threads allowed have not been reach, a thread count elasticity operation may be triggered to further increase the thread count for increased performance as depicted in the multilevel elasticity operation 710C.

With an increased number of threads, an additional round of threading model elasticity places one more scheduler queue to advance the performance as illustrated in the multilevel elasticity operation 710D (e.g., more queues can be added for the increasing thread count). At some point, further adjusting the number of threads or threading configuration no longer improves the performance as illustrated in the multilevel elasticity operation 710E (e.g., performance stabilizes or reduces).

Hence, as depicted in the multilevel elasticity operation 710E, the threading mode elasticity operation reverts the adjustment (e.g., slows, stops, or reverses an adjustment to the number of threads or threading configuration) and stabilizes until the workload changes.

Figure 8:
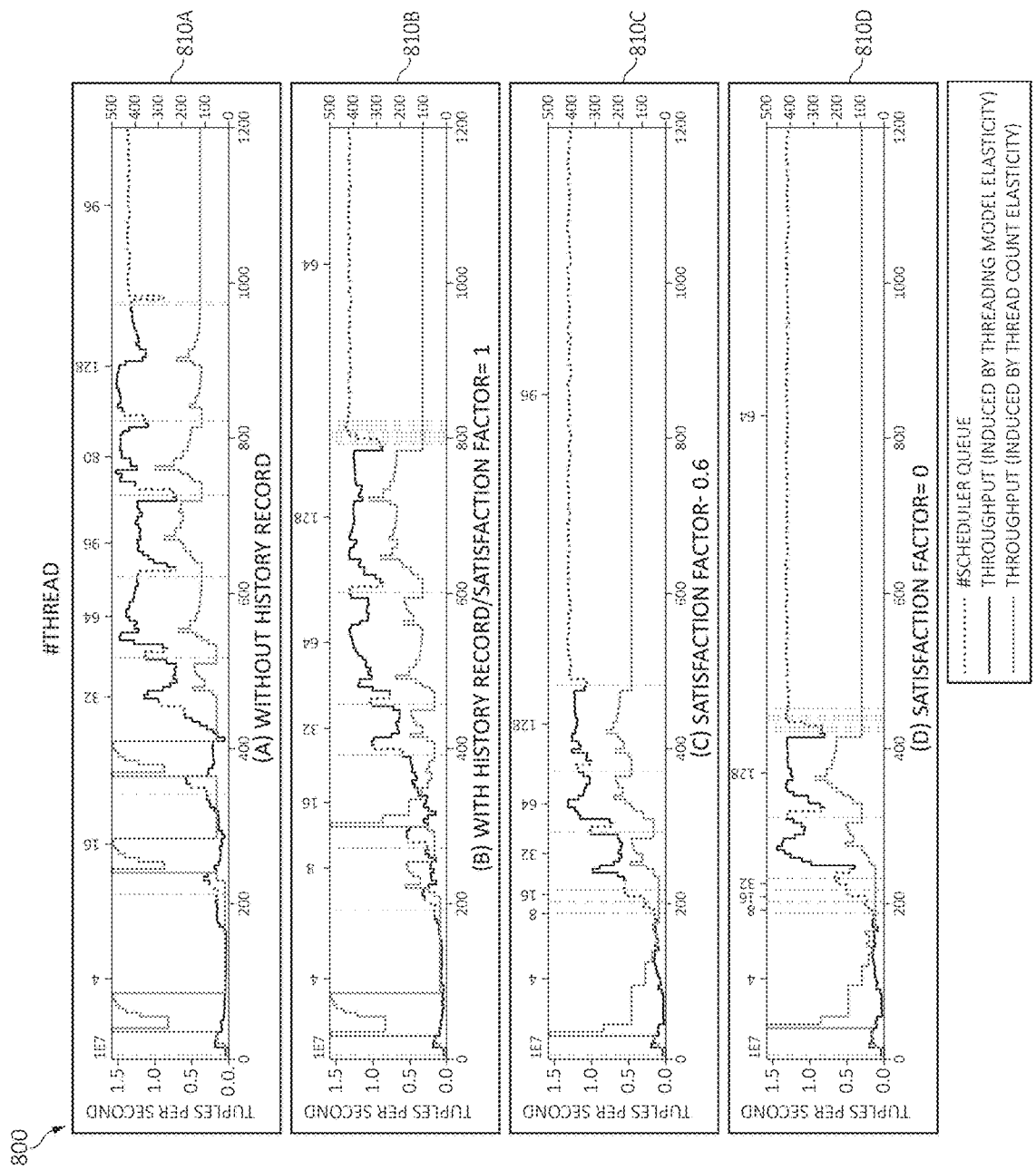
FIG. 8 is a graph depicting operations results of multi-level elasticity with different sets of optimizations in which aspects of the present invention may be realized.

Turning now to FIG. 8, diagram 800 depicts various graphs 810A-D depicting operations results of multi-level elasticity with different sets of optimizations. That is, FIG. 8 illustrates exemplary test cases/runs of multi-level elasticity with different sets of optimizations to demonstrate how they effect settling time so as provide optimizations to shorten the adaptation period of the multilevel elasticity operations (see FIG. 7). In one aspect, one or more of the components, modules, services, applications, and/or functions described in FIGS. 1-7 may be used in FIG. 8 such as, for example, the dynamic threading model 500 of FIG. 5.

In one aspect, in each of the graphs 810A-D, the bottom X-axis shows the time into the experiments in a selected time period (e.g., seconds). The left Y-axis represent the throughput. The right Y-axis shows the number of scheduler queues. The top x-axis is the number of threads for that window of time. The first line shows the changes in the scheduler queues caused by threading model elasticity. The dotted and solid black lines shows the changes in throughput induced by the thread count elasticity and threading model elasticity, respectively. The graph used in all these experiments in the graphs 810A-D may be an operator pipeline with varying performance/cost of 10, 000, 100 and 1 FLOPs to process one tuple. The tuple payload may be, for example, 1024 B.

Graph 810A illustrates adjustments to the thread count to trigger threading model elasticity operations. Due to these adjustments, the throughput keeps increasing and finally stabilizes after 1000 seconds. It should be noted that both the thread count and threading model elasticity operation contribute to improving the throughput as they are iteratively triggered. In graph 810A, it is observed that though the threading model elasticity is triggered every time the thread count changes, the threading configuration may remain unchanged after exploration. For example, in graph 810A, after the window of time with 64 threads, the scheduler queue placement changes many times, but it eventually settles back to the level it started at. This observation motivates the first optimization to shorten the adaptation period by learning from history. As can be seen from graph 810A, at 96 threads, adapting the threading model configuration can no longer further improve the performance in comparison to the throughput achieved at 64 threads. Hence, the same queue placement works for both 64 and 96 threads. With this history information, when the thread count is decreased from 96 to 80, adjusting the threading model may be skipped by approximating that the same configuration is best/optimal for any thread count between 64 and 96. By learning from history, the essence of this optimization is to keep track of the thread range (N, M) that work well with the recent threading model adjustment, meaning from thread count N to thread count M, the optimal threading model configuration remains unchanged.

At this point, the following pseudocode presents the data structure to keep the history record:

```
enum AdjustDirection{UP, DOWN, NONE};
class AdjustHistEntry {
public:
    AdjustDirection toContinue(int newThreadLevel) {
        if (newThreadLevel > maxThread) return UP;
        if (newThreadLevel < minThread) return DOWN;
        return NONE;
    }
};
AdjustHistEntry lastAdjustment;
```

The historical information of previous adjustments may be stored in a database (e.g., stored in the "lastAdjustment" as an entry of "AdjustHistEntry" of the pseudocode). Inside each historical record of threading model adjustment ("AdjustHistEntry" of the pseudocode), the maximum ("maxThread") and minimum ("minThread") number of threads that have best/optimally performed for a selected configuration may be recorded and retained. When the thread count changes, the record of the most recent queue placement may be analyzed. If the new thread count is within the best/optimal thread range of the current placement, any adjusting the threading model may be skipped (for a selected period of time) and continue to adapt the thread count. If the new thread count is above the upper bound of the best/optimal thread range, an operation may be performed to determine if using more scheduler queues can further improve/optimized performance. Otherwise, if the thread count is below the lower bound of the thread range, one or more operators may be switched to use manual threading. When no further improvement can be obtained by solely changing the threading model configuration, the present invention may switch back to the thread count elasticity phase. If there is any change in the threading model configuration, the adjustment history record may be updated to reflect the change. Otherwise, the thread range may be updated for the existing queue placement.

By learning from the history data, the graph 810B depicts the ability to shorten the adaptation period by a defined range (e.g., by at least 20%). For example, at around 800 seconds graph 810B, there are several narrow dotted vertical lines indicating that the thread count changed but queue adjustments were skipped. In one aspect, in order to shorten the adaptation period without sacrificing the performance one or more patterns may be observed and/or learned such as, for example, as illustrated in the graph 810A and 810B. For example, when the thread count increases to 16 and 32, performance improvement is achieved by changing the thread count. After analyzing the threading model configuration, the queue placement remains unchanged. Hence when only the thread count change improves the performance significantly, the threading model adjustment may be limited. Such observations leads to the second optimization to shorten the adaptation period of a satisfaction factor ("sf"). The essence of the satisfaction factor ("sf") optimization is that if the primary adjustment (e.g., a thread count adjustment) alone can improve the performance by a significant amount, the secondary adjustment (e.g., the threading model adjustment) can be skipped unless the thread count alters again. Thus, the following condition may be used determine when to skip the secondary adjustment, as illustrated in equation 1:

$$\left(\frac{currThroughput}{prevThroughput} - 1\right) > sf\left(\frac{newThreadCount}{prevThreadCount} - 1\right), \quad (1)$$

where sf indicates the relative performance gain expected as compared to the increase in the thread count, and its value is between 0 and 1. In one aspect, when sf is closer to 0, faster adaptation may be preferred and the queue adjustment may be skipped more frequently (as compared to threading model adjustment). Alternatively, when the sf is closer to 1, increased/optimal performance may be preferred and the threading model adjustment may be performed more frequently (as compared to thread count adjustment).

In the graph 810C and graph 810C, by way of example only, the sf set to 0.6 and 0 respectively. In graph 810C, the system skips the threading model adjustment when the thread count is 8 and 16 because the thread count change alone results in more than an 80% throughput improvement. In graph 810D, with the sf equal to 0 (e.g., sf=0), the threading model adjustment may also skipped at 32 threads as the sf of 0 means unless there is performance drop with an increased thread count, the threading model elasticity may not be triggered. Overall, with the use of the history record and sf, the adaptation period is reduced from 1,000 seconds to just over 400 seconds. The improvement in adaptation time is achieved without sacrificing throughput; as can be seen in FIG. 8, the final throughput after adaptation is close across different runtime setups. Both optimizations of learning from history and the use of satisfaction factor provide the settling time property of SASO.

In one aspect, the present invention provides for an enhanced multi-level elasticity operation using a scheduling operation to automate multi-level elasticity, as illustrated in the following pseudocode:

```
void init( ) {
    threadingModelElasticity = true;
    threadCountElasticity = false;
}
void adapt( ) {
    if (threadCountElasticity) {
        threadLevel = threadCountAdjustment( );
        sf = calculateSatisfactionFactor( );
        if (sf < THRE) { //Satisfaction factor optimization
            direction = lastAdjustment.toContinue(threadLevel)
            if (direction != NONE) { //Learning from history
                threadingModelElasticity = true;
                threadCountElasticity = false;
            }
        }
    } else if (threadingModelElasticity) {
        decision = threadingModelAdjustement( );
        if (decision == CHANGE) createNewAdjustHistEntry(newThreadLevel);
        if (decision == STAY) updateAdustHistEntry(newThreadLevel);
```

```
    if (decision == CONTINUE) return;
    threadCountElasticity = true;
    threadingModelElasticity = false;
    }
}
```

The iterative refinement process may be composed of two components: the threading model elasticity ("threadingModelElasticity") to adjust the scheduler queue placement and the thread count elasticity ("threadCountElasticity") to adapt the number of threads. When the thread count changes, the satisfaction factor ("sf") may be calculated. If the satisfaction factor ("sf") is less than the pre-defined threshold, a record (e.g., historical record) of the most recent threading model adjustment may be analyzed (e.g., if the queue elasticity at the current thread count has been analyzed/explored, redundant work may be avoided by using the record). Otherwise, the adjusting of the threading model may be skipped.

If the new thread count is within the best/optimal thread range of the current placement, any adjusting of the threading model may be skipped and the thread count may be continued to be adapted/adjusted. If the number of threads is larger than an upper bound of a defined thread range, a determination may be performed to determine if switching more operators to use dynamic threading improves performance and a direction adjustment "AdjustDirection" may be set to a selected direction (e.g., "UP"). Otherwise if the thread count is smaller than a lower bound of the define thread range, the number of operators using dynamic threading model may be decreased and a direction adjustment ("AdjustDirection") may be set to an alternative selected direction (e.g., "DOWN").

It should be noted that with the adjustment direction set to a selected direction (e.g., "UP") for a threading model adjustment operation, when determining the positive and/or negative impact/effect of decreasing the number of operators under a dynamic threading model, the same threading model adjustment operation may be used in the reverse order (e.g., start with a group of the lowest relative performance/cost). When no further improvement can be obtained by solely changing the threading model adjustment, the threading model adjustment operation may switch back to the thread count elasticity phase. If there is any change in the threading model choices for operators, the adjustment history record may be updated/adjusted to reflect the change ("AdjustDecision" is set to "CHANGE" as discussed in FIG. 6). Otherwise the thread range may be updated for the existing queue placement (e.g., "AdjustDecision" is "STAY" as discussed in FIG. 6).

Figure 9:
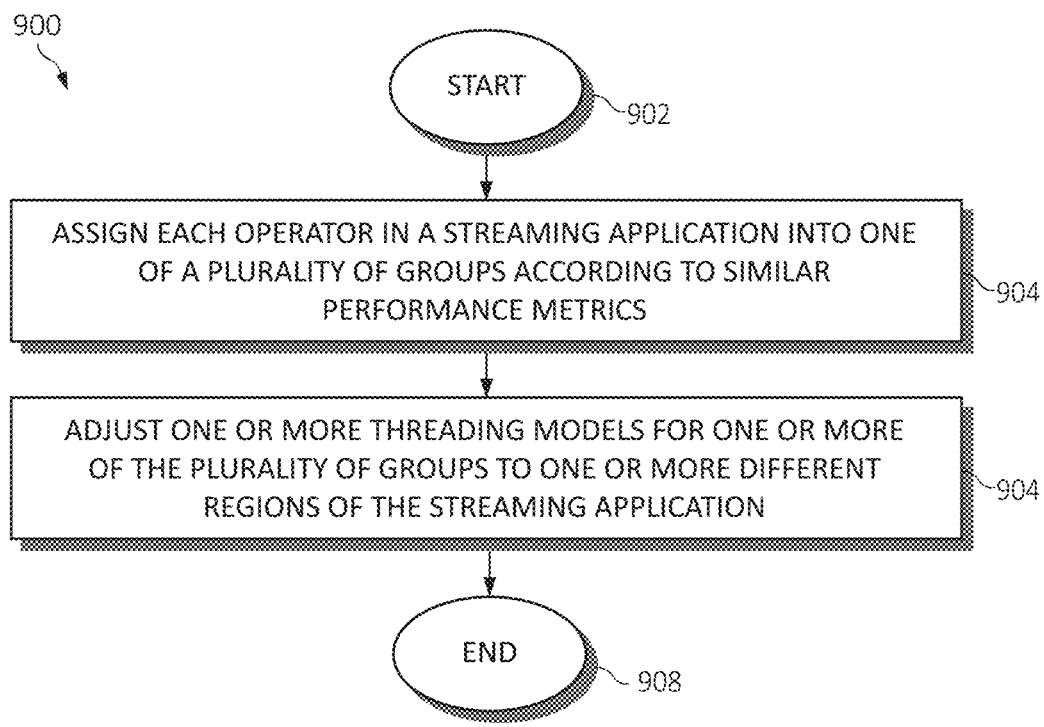
FIG. 9 is a flowchart diagram depicting an exemplary method for automating multidimensional elasticity operations for streaming applications by a processor in which aspects of the present invention may be realized.

Turning now to FIG. 9, a method 900 for automating multidimensional elasticity for streaming applications in a computing environment is depicted, in which various aspects of the illustrated embodiments may be implemented. The functionality 900 may be implemented as a method executed as instructions on a machine, where the instructions are included on at least one computer readable medium or on a non-transitory machine-readable storage medium. The functionality 900 may start in block 902.

Each operator in a streaming application may be identified and assigned into one of a variety of groups according to similar performance metrics, as in block 904. One or more threading models may be adjusted for one or more of the groups to one or more different regions of the streaming application, as in block 906. The functionality 900 may end in block 908.

Figure 10:
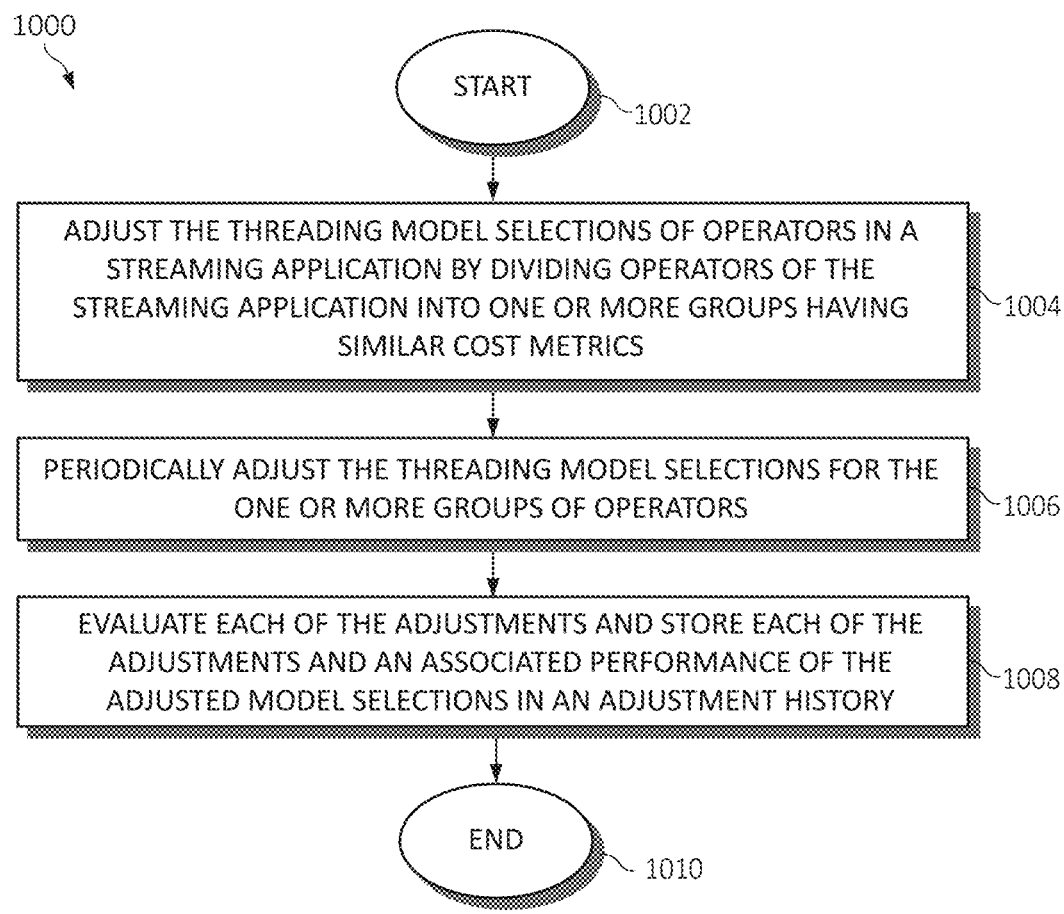
FIG. 10 is a flowchart diagram depicting an additional exemplary method for automating multidimensional elasticity operations for streaming applications by a processor, again in which aspects of the present invention may be realized.

Turning now to FIG. 10, an additional method 1000 for automating multidimensional elasticity for streaming applications in a computing environment is depicted, in which various aspects of the illustrated embodiments may be implemented. The functionality 1000 may be implemented as a method executed as instructions on a machine, where the instructions are included on at least one computer readable medium or on a non-transitory machine-readable storage medium. The functionality 1000 may start in block 1002.

One or more threading model selections of operators in a streaming application may be adjusted according to operators of the streaming application divided into one or more groups having similar performance (e.g., cost) metrics, as in block 1004. One or more of the threading model selections for each of the one or more groups of operators may be periodically adjusted, as in block 1006. Each of the adjustments may be evaluated and each of the adjustments and an associated performance of the adjusted model selections may be stored in an adjustment history, as in block 1008. The functionality 1000 may end in block 1010.

In one aspect, in conjunction with and/or as part of at least one block of FIGS. 9-10, the operations of methods 900 and/or 1000 may include each of the following. The operations of methods 900 and/or 1000 may evaluate each adjustment of the one or more threading model selections and retaining information associated with the adjustment.

The operations of methods 900 and/or 1000 may define the adjustment of the one or more threading model selections to be performed as a multidimensional elasticity performance operation. The multidimensional elasticity performance operation includes a primary adjustment and a secondary adjustment to one or more threading models or thread counts.

The operations of methods 900 and/or 1000 may adjust the one or more threading model selections, wherein adjusting the one or more threading model selections triggers a search to identify an appropriate number of thread counts for the adjusted one or more threading model selections, and/or adjust a thread count, wherein adjusting the thread count triggers a search to identify an appropriate threading model for the adjusted thread count.

The operations of methods 900 and/or 1000 may learn and/or identify a range of N number of thread counts for a selected threading model. The range of N number of thread counts include a maximum number of thread counts and a minimum number of thread counts, where "N" is a positive integer or selected variable. The operations of methods 900 and/or 1000 may retain a configuration for the selected threading model while adjusting the range of the N number of thread counts for the selected threading model.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for automating multidimensional elasticity operations for streaming applications in a computing environment, comprising:
assigning each operator in a streaming application into one of a plurality of groups according to similar operator performance metrics of an operator performance metric computed for each operator, wherein the operator performance metric is a measure of a percentage of processing time spent by the processor on a respective operator in comparison to each other operator running on the processor, and wherein the operator performance metric is periodically collected by a profiler by taking a snapshot of all actively running threads on the processor and incrementing a counter by a number of times each operator appears in the snapshot; and adjusting one or more threading models for one or more of the plurality of groups to one or more different regions of the streaming application.

2. The method of claim 1, further including evaluating each adjustment of the one or more threading model selections and retaining information associated with the adjustment.

3. The method of claim 1, further including defining the adjusting of the one or more threading model selections to be performed as a multidimensional elasticity performance operation; wherein the multidimensional elasticity performance operation includes a primary adjustment and a secondary adjustment to one or more threading models or thread counts.

4. The method of claim 1, further including adjusting the one or more threading model selections, wherein adjusting the one or more threading model selections triggers a search to identify an appropriate number of thread counts for the adjusted one or more threading model selections.

5. The method of claim 1, further including adjusting a thread count, wherein adjusting the thread count triggers a search to identify an appropriate threading model for the adjusted thread count.

6. The method of claim 1, further including learning a range of N number of thread counts for a selected threading model, wherein the range of N number of thread counts include a maximum number of thread counts and a minimum number of thread counts.

7. The method of claim 6, further including retaining a configuration for the selected threading model while adjusting the range of the N number of thread counts for the selected threading model.

8. A system for automating multidimensional elasticity operations for streaming applications in a computing environment, comprising:

one or more computers with executable instructions that when executed cause the system to:

assign each operator in a streaming application into one of a plurality of groups according to similar operator performance metrics of an operator performance metric computed for each operator, wherein the operator performance metric is a measure of a percentage of processing time spent by the processor on a respective operator in comparison to each other operator running on the processor, and wherein the operator performance metric is periodically collected by a profiler by taking a snapshot of all actively running threads on the processor and incrementing a counter by a number of times each operator appears in the snapshot; and adjust one or more threading models for one or more of the plurality of groups to one or more different regions of the streaming application.

9. The system of claim 8, wherein the executable instructions further evaluate each adjustment of the one or more threading model selections and retaining information associated with the adjustment.

10. The system of claim 8, wherein the executable instructions further define the adjusting of the one or more threading model selections to be performed as a multidimensional elasticity performance operation; wherein the multidimensional elasticity performance operation includes a primary adjustment and a secondary adjustment to one or more threading models or thread counts.

11. The system of claim 8, wherein the executable instructions further adjust the one or more threading model selections, wherein adjusting the one or more threading model selections triggers a search to identify an appropriate number of thread counts for the adjusted one or more threading model selections.

12. The system of claim 8, wherein the executable instructions further adjust a thread count, wherein adjusting the thread count triggers a search to identify an appropriate threading model for the adjusted thread count.

13. The system of claim 8, wherein the executable instructions further learn a range of N number of thread counts for a selected threading model, wherein the range of N number of thread counts include a maximum number of thread counts and a minimum number of thread counts.

14. The system of claim 13, wherein the executable instructions further retain a configuration for the selected threading model while adjusting the range of the N number of thread counts for the selected threading model.

15. A computer program product for automating multidimensional elasticity operations for streaming applications by a processor, the computer program product comprising a non-transitory computer-readable storage medium having computer-readable program code portions stored therein, the computer-readable program code portions comprising:

an executable portion that assigns each operator in a streaming application into one of a plurality of groups according to similar operator performance metrics of an operator performance metric computed for each operator, wherein the operator performance metric is a measure of a percentage of processing time spent by the processor on a respective operator in comparison to each other operator running on the processor, and wherein the operator performance metric is periodically collected by a profiler by taking a snapshot of all actively running threads on the processor and incrementing a counter by a number of times each operator appears in the snapshot; and an executable portion that adjusts one or more threading models for one or more of the plurality of groups to one or more different regions of the streaming application.

16. The computer program product of claim 15, further including an executable portion that evaluates each adjustment of the one or more threading model selections and retaining information associated with the adjustment.

17. The computer program product of claim 15, further including an executable portion that define the adjusting of the one or more threading model selections to be performed as a multidimensional elasticity performance operation; wherein the multidimensional elasticity performance operation includes a primary adjustment and a secondary adjustment to one or more threading models or thread counts.

18. The computer program product of claim 15, further including an executable portion that adjusts the one or more threading model selections, wherein adjusting the one or more threading model selections triggers a search to identify an appropriate number of thread counts for the adjusted one or more threading model selections.

19. The computer program product of claim 15, further including an executable portion that adjusts a thread count, wherein adjusting the thread count triggers a search to identify an appropriate threading model for the adjusted thread count.

20. The computer program product of claim 15, further including an executable portion that:
- learns a range of N number of thread counts for a selected threading model, wherein the range of N number of thread counts include a maximum number of thread counts and a minimum number of thread counts; and
- retains a configuration for the selected threading model while adjusting the range of the N number of thread counts for the selected threading model.

* * * * *